(12) United States Patent
Kessler et al.

(10) Patent No.: US 9,131,706 B2
(45) Date of Patent: Sep. 15, 2015

(54) HANDLING SYSTEM FOR TRANSPORTING, REMOVING OR INSERTING ROD-LIKE ELEMENTS

(75) Inventors: Günter Kessler, Frankfurt am Main (DE); Peter Wiemer, Meerbusch (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 615 days.

(21) Appl. No.: 12/896,308

(22) Filed: Oct. 1, 2010

(65) Prior Publication Data

US 2011/0081224 A1    Apr. 7, 2011

(30) Foreign Application Priority Data

Oct. 2, 2009 (EP) ..................................... 09012520

(51) Int. Cl.
*A22C 15/00* (2006.01)
*A22C 21/00* (2006.01)

(52) U.S. Cl.
CPC ............... *A22C 15/001* (2013.01); *A22C 15/00* (2013.01); *A22C 15/002* (2013.01); *A22C 21/0076* (2013.01)

(58) Field of Classification Search
USPC ............................................... 452/30, 46, 51
See application file for complete search history.

(56) References Cited

U.S. PATENT DOCUMENTS

| | | | | |
|---|---|---|---|---|
| 4,547,931 A | * | 10/1985 | Staudenrausch et al. | 452/51 |
| 4,612,684 A | * | 9/1986 | Kollross | 452/35 |
| 4,644,607 A | * | 2/1987 | Sziede | 452/51 |
| 5,082,419 A | * | 1/1992 | Kollross et al. | 414/800 |
| 5,100,364 A | * | 3/1992 | Kollross et al. | 452/185 |
| 5,238,353 A | * | 8/1993 | Kollross et al. | 414/746.4 |
| 5,354,230 A | * | 10/1994 | McFarlane et al. | 452/51 |
| 6,786,321 B2 | * | 9/2004 | Borkiewicz et al. | 198/419.3 |
| 7,166,020 B2 | * | 1/2007 | Van De Wal | 452/32 |
| 7,255,638 B2 | * | 8/2007 | Stimpfl | 452/32 |
| 7,354,338 B2 | * | 4/2008 | Nakamura et al. | 452/30 |
| 7,614,942 B2 | | 11/2009 | Liermann et al. | |

(Continued)

FOREIGN PATENT DOCUMENTS

| | | | |
|---|---|---|---|
| DE | 2818024 A1 | | 11/1979 |
| DE | 10040417 | * | 3/2002 |

(Continued)

OTHER PUBLICATIONS

EP 09 01 2520 European Search Report and Opinion dated Feb. 10, 2010, 6 pgs.

(Continued)

*Primary Examiner* — David Parsley
(74) *Attorney, Agent, or Firm* — Fitch, Even, Tabin & Flannery LLP (57) ABSTRACT

The invention relates to a handling system for transporting, removing or inserting rod-like elements from or into a storage frame, the rod-like elements, like smoking rods, serving for storing products, each having a sausage-shaped body and a loop for a pendulously storage of the products. The handling system comprises a robotic device with at least one robotic arm being movably in three dimensions, at least one gripping device for reversibly gripping the rod-like elements, wherein the gripping device is attached to the robotic arm of the robotic device. Moreover, a preventing unit for preventing uncontrolled movement of the products hanging up on the rod-like elements is provided.

10 Claims, 7 Drawing Sheets

(56) References Cited

U.S. PATENT DOCUMENTS

| | | | |
|---|---|---|---|
| 7,735,630 B2* | 6/2010 | Borkiewicz et al. | 198/465.4 |
| 7,766,729 B2* | 8/2010 | Liermann et al. | 452/51 |
| 2005/0159093 A1* | 7/2005 | Kasai | 452/51 |
| 2005/0239386 A1 | 10/2005 | Nakamura et al. | |

FOREIGN PATENT DOCUMENTS

| | | | |
|---|---|---|---|
| EP | 0093037 | * | 11/1983 |
| EP | 1464225 A2 | | 10/2004 |
| EP | 1518461 A2 | | 3/2005 |
| EP | 1985184 | * | 10/2008 |
| EP | 1994829 A1 | | 11/2008 |
| EP | 2008522 A1 | | 12/2008 |
| JP | 2000-139331 | * | 5/2000 |
| JP | 2002-330695 | * | 11/2002 |
| JP | 2003-180239 | * | 7/2003 |
| WO | WO 92/03929 | * | 3/1992 |

OTHER PUBLICATIONS

Abstract of EP 1994829 (A1) obtained from http://worldwide.espacenet.com on Sep. 13, 2011, 1 pg.

Abstract of EP 2008522 (A1) obtained from http://worldwide.espacenet.com on Sep. 13, 2011, 1 pg.

* cited by examiner

HANDLING SYSTEM FOR TRANSPORTING, REMOVING OR INSERTING ROD-LIKE ELEMENTS

This patent application claims priority to and the benefit of European patent application EP 09 012 520.4-1260, filed Oct. 2, 2009, which is hereby incorporated herein by reference.

The invention relates to a handling system according to the preamble of claim 1. In particular, the present invention refers to a handling system for transporting, removing or inserting rod-like elements from or into a storage frame, the rod-like elements, like smoking rods, serving for storing products, like sausages, each having a sausage-shaped body and a loop for a pendulously storage of the products. The handling system comprises a robotic device with at least one robotic arm being movably in three dimensions, and at least one gripping device for reversibly gripping the rod-like elements, wherein the gripping device is attached to the robotic arm of the robotic device.

In an already known production line for producing sausage products, a filling tube is provided for feeding a packing material or tubular casing, respectively, with sausage meat wherein the tubular casing is closed at one end facing in the filling direction by a first clip. After the filling operation is concluded, the tube-like casing is finally closed. If the sausage product is later to be hung up, for example for the purposes of smoking or storage, a suspension loop is fed thereto in such a way that, when the clip is fitted, it is embraced by the clip and is thus secured to the sausage product. The term loops in accordance with this invention is used to denote all at least partially flexible means, by way of which articles can be hung up.

After the filling process, the sausage products are subjected to further processing, for example in a smoking chamber. For that purpose, the sausage products have to be transported to the end of the conveyor and there taken over by an automatic hanging line, in which the sausage products are hung up on a smoking rod at their loops one after another in such a way that, as far as possible, they do not touch each other. Afterwards, the smoking rods are transported to a further storage frame which has rolls for transporting the smoking rods in a smoking chamber. A robotic device is provided for removing smoking rods from the storage frame and/or inserting smoking rods into the storage frame.

A robotic device being part of a handling system and comprising a gripping device according to the preamble of claim 1 is known from EP 1 994 829 A1.

In gripping and moving the smoking rods with high velocity, the sausage products tend to swing on their loops. The swinging can cause the sausage products to be partially or completely ripped off their loops, or cause the packaging material or tubular casing of the sausage products to burst open. Both cases result inevitable in notable damages to the sausage products, which lead to outcast and unnecessary costs.

Therefore, the object of the invention is to provide a handling system of the kind set forth in the opening part of the specification, which protects the sausage products from damages when transported hanging up on rod-like elements, and to provide a method used in such a handling system.

The aforesaid object is achieved with respect to the handling system by the features of claim 1. Advantageous configurations of the invention are described in claims 2 to 9.

According to the invention, the handling system comprises a robotic device, at least one gripping device and a preventing unit for preventing uncontrolled movement of the products hanging up on the rod-like elements. The preventing unit is positioned in such a manner that it engages the products. Thereby, the products are tranquillized and pacified, that means an uncontrolled movement of the products is prevented which prevents damaging of the products. Thus, the degree of free movement of the products is restricted. It has to be noted that the preventing unit is preferably a separate assembly group. That means the preventing of an uncontrolled movement of the products is achieved by an independent assembly group and not by the gripping device itself.

According to an embodiment of the invention, the preventing unit engages the sausage-shaped body of the product. Thus, the preventing unit engages the part of the product which swings soonest and most of all. In order to prevent the free movement, the preventing element engages this part of the product. Alternatively, the preventing unit can engage the loops of the products. Moreover, it has to be noted that the preventing unit can also be formed by the combined effect of a constructive element and a respective control of the movement of the robotic device. For example, it can be provided a bar being preferably a part of the preventing unit, extending at least approximately along the rod-like element and getting in touch preferably with the loops of products. As soon as the rod-like element has to be moved by the handling system to the storage frame, the gripping device can be tilted so that the loops can entangle, at least partly, the bar. Thus, the length of the loop which can freely be swung will be reduced. This solution can be combined with the other solution for a preventing unit described in this application.

The preventing unit is at least adjustable in its vertical height. By way of trial and/or mathematical analysis, the contact point is detected in which the preventing unit should contact the products, in particular the sausage-shaped body of the products, to prevent effectively the movements of the products. The position of the contact point depends on the length of the product (i.e. the length of the sausage-shaped body and the loop) and/or the weight of the product. As the vertical height of the preventing unit is adjustable, the preventing unit is adaptable to different kind of products.

According to an embodiment, the preventing unit includes a first preventing element wherein the first preventing element comprises openings positioned on a bump bar, the openings being able to engage the products. The first preventing element engages the products and thereby tranquillizes and pacifies the products. The sizes and shapes of the openings can vary; especially the sizes and the shapes of the openings are adaptable to the sizes and shapes of the sausage products. Instead of openings, the bump bar can also comprise burlings and/or ribs.

Preferably, the preventing unit comprises a second preventing element, the second preventing element being formed substantially U-shaped. The U-shaped element has a bottom part and two side parts. The second preventing element is positioned in such a manner that the product lies between the two side parts of the second preventing element. Thus, the free movement of the sausages is restricted.

According to an embodiment, the second preventing element is movably between an in-operating position and an operating position in which the second preventing element engages the products. In the in-operating position, the preventing element is arranged on one side of the sausage products, namely on the side of the sausage products facing the robotic arm. In the operating position which is also called "preventing position", the second preventing element is retracted so that a part of the preventing element is positioned on the side of the product facing away from the robotic arm. This allows an easy positioning of the products between the side parts of the second preventing element. The second preventing element can also be movable between two positions, namely an in-operating position and an operating position, without being U-shaped.

Preferably, the second preventing element comprises a wavelike rim. The rim is adapted to engage the products. With the second preventing element is in the operating position, the rim engages the sausage products, in particular the sausage-shaped bodies. The rim can have any shape and thus can be adapted to the shape of the sausage products. The second preventing element can also comprise a wavelike rim without being movably between two positions and without being U-shaped.

It has to be noted that the inventive handling system can be provided with the first and/or second preventing element.

A crossbar can be provided, the preventing unit extending essentially perpendicular to the crossbar.

The gripping device comprises a first jaw being fixedly attached to the robotic device and a second jaw being pivotably around a pivot axis, the pivot axis being essentially parallel to the rod-like element. The jaws can reversibly engage the rod-like element. As the second jaw is pivotably, firstly, the first jaw is positioned next to the rod-like element engaging it and afterwards the second jaw is pivoted. Thereby, it is ensured that the rod-like element is correctly positioned between the jaws and is securely gripped. The rod-like element can have any profile (e.g. rectangular, circular) and the length of the pivotable second jaw can vary.

According to another embodiment, the first and/or second jaw is movable linearly and reversibly towards the other jaw and the smoking rod. For example, the second jaw is pivoted around the pivot axis and the first jaw is moved linearly towards the second jaw. Furthermore, the second jaw may be positioned from above such that the smoking rod is located between the first and second jaw. Afterwards, the first and/or second jaw is moved linearly towards each other. Thereby, the jaws may be self-locking. Advantageously, such a gripping device has a small height of construction which could be important if the trays of the storage frame are closely positioned therein. Thus, the engagement of the gripping device is simplified by the gripping device comprising the linear movable jaw. In order to grab the rod-like element securely, at least one jaw comprises a substantially L-shaped portion, each portion having an undercut.

Preferably, a layer is provided in the undercut of the at least one jaw, the layer being more flexible than the jaw. The layer engages the rod-like element. Uneven or bumpy areas of the rod-like elements are compensated by the layer such that the rod-like elements are securely gripped. Such uneven or bumpy areas can occur because of inappropriate handling of the rod-like elements.

Preferably, the second jaw is self-locking to prevent an unintentional movement of the jaw. The self-locking can be achieved by a pin or a bolt. For example, such an unintentional movement occurs in the case of energy loss.

According to an embodiment, a crossbar is provided, the first jaw extending substantially over the entire length of the crossbar. Therefore, the first jaw engages the rod-like element over the entire length which increases the holding force.

Preferably, a sensor device is provided monitoring an operating range of the handling system, the operating range being changed automatically during operation. The sensor device detects an object, like an operator, being in the operating range of the handling system, and stops the movement of the robotic device immediately as soon as such an object occurs in the operating range of the handling system. Thus, the sensor device is a safety device preventing accidents. The sensor device is able to change automatically the monitored operating range of the handling system, i.e. the sensor device monitors a first operating range while the handling system removes the smoking rods from an automatic hanging line and inserts them in a first storage frame. Afterwards, the sensor device monitors a second operating range while the handling system removes the smoking rods from the automatic hanging line and inserts them in a second storage frame. Simultaneously, an operator or a motorized device can transport the storage frame in a smoking chamber. The operator is not detected by the sensor device, as the sensor device monitors the second operating range. Therefore, the handling system is not stopped automatically, as the operator does not work in the monitored operating range. The operator can transport the storage frame riskless in the smoking chamber.

The second jaw may be pivoted around an axis which is perpendicular to the longitudinal axis and to the lateral axis of the robotic arm. That means the axis is parallel to the vertical axis of the robotic arm. With other words, the axis is parallel to the bars of the preventing unit. Thus, the second jaw compensates unevenness of smoking rods, especially unevenness seen in the longitudinal axis of the smoking rods.

Furthermore, the present invention also relates to a robotic device suitable for use in a handling system according to the invention. In regard to the advantages of the inventive robotic device, it is referred to the aforesaid advantages and benefits.

Furthermore, the present invention also relates to a gripping device suitable for use in a handling system according to the invention. In regard to the advantages of the inventive gripping device, it is referred to the aforesaid advantages and benefits.

The gripping device can comprise a first jaw being fixedly attached to the robotic device and a second jaw being pivotably around a pivot axis, the pivot axis being essentially parallel to the rod-like element.

According to an embodiment, the first jaw extends over the entire length of the crossbar and thus over the entire length of the smoking rod. The second jaw may also extend over the entire length of the crossbar and thus the smoking rod. Thus, the products, in particular the sausages, are fixed over the entire length and the holding force is increased.

According to an embodiment, at least one jaw comprises a substantially L-shaped portion, each portion having an undercut.

Preferably, a layer is provided in the undercut of the at least one jaw, the layer being more flexible than the jaw.

The second jaw can be self-locking to prevent an unintentional movement of the jaw.

Furthermore, the present invention also relates to a preventing unit suitable for use in a handling system according to the invention. In regard to the advantages of the inventive preventing unit, it is referred to the aforesaid advantages and benefits.

Preferably, the preventing unit is at least adjustably in its vertical height.

According to an embodiment, the preventing unit comprises a first preventing element, the first preventing element comprising openings positioned on a bump, the products being able to engage the openings.

The preventing unit can also comprise a second preventing element, the second preventing element is formed substantially U-shaped.

Preferably, the second preventing element is movably between an in-operating position and an operating position in which the second preventing element engages the product. The second preventing element can also be movably between two positions, namely an in-operating position and an operating position, without being U-shaped.

Preferably, the second preventing element comprises a wavelike rim. The second preventing element can also comprise a wavelike rim without being movably between two positions and without being U-shaped.

Furthermore, the present invention also relates to a method for transporting, removing or inserting rod-like elements from or into a storage frame having a robotic device used in a handling system according to the invention comprising the following steps: positioning the robotic device such that the stationary first jaw being fixedly attached to the robotic device is essentially parallel to the rod-like element and engages the rod-like element, pivoting the pivotable second jaw around the pivot axis such that the second jaw engages the rod-like element and the rod-like element is grabbed between the two jaws, engaging the products by the gripping device for preventing uncontrolled movement of the products hanging up on the rod-like elements, and removing the rod-like element from the storage frame or inserting the rod-like element into the storage frame.

According to an embodiment, the second preventing element is moved in its operating position in which the second preventing element engages the products. Especially, the second preventing position swings into its operating position.

Thereby, an operating range of the robotic device can be monitored by a sensor device, the operating range being changed automatically during operation.

Further features and advantages may be understood by reference of the following explanation of a preferred embodiment in conjunction with the attached drawings.

Figure 1:
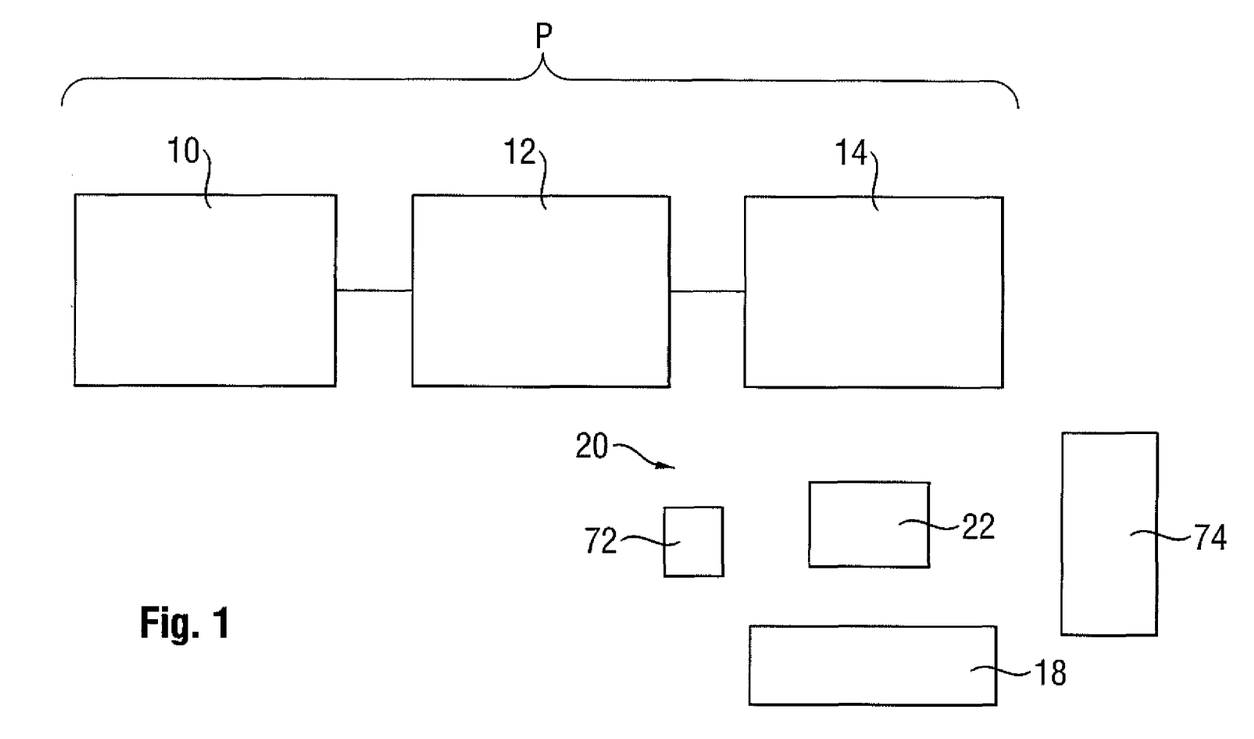
FIG. 1 is a schematically view of a production line for producing sausages including a handling system according to the invention, the handling system comprising a gripping device according to the invention, a robotic device according to the invention and a preventing unit according to the invention.

In FIG. 1, a production line P for producing sausages is schematically shown. As main components, the production line P comprises a filling tube 10 for carrying a stock of a packing material or a tubular casing, respectively, and being connected with a not shown filling machine for filling the tubular casing with a filling material like sausage meat, an clipping machine 12 for closing the tubular casing with clips and for separating a tubular casing from the stock of the tubular casing to form separate products W and for providing a loop at said product, as well as an automatic hanging line 14 for hanging up the products W with their loops on a rod-like element like a smoking rod. From the hanging line 14, the rod-like elements are fed to a storage device like a storage frame 18 by an inventive handling system 20 being described below in detail in conjunction with FIGS. 2 to 7.

The production process carried out by the production line P is as follows: The filling tube 10 feeds sausage meat into the tubular casing which is closed at one end facing in the filling direction by a first clip. After the filling operation is concluded, the automatic clipping machine 12 produces a plait free of sausage meat, places a second clip on said plait and cuts the tubular casing in order to form a separate sausage product W. As the sausage product W is hung up, for example for the purposes of smoking or storage, a suspension loop is fed thereto in such a way that, when the first or second clip is fitted, it is embraced by the clip and is thus secured to the sausage product W. After the filling process, the sausage products W are subjected to further processing for an example in a smocking chamber. For that purpose, the sausage products W have to be transported to the end of the automatic hanging line 14, in which the sausage products W are hung up on said smoking rod at their loops one after another and in such a distance that, as far as possible, they do not touch each other. Afterwards, the smoking rods are transported to the storage frame 18 with rolls (see FIG. 1) to transport the smoking rods in a smoking chamber (not shown).

The inventive handling system 20 includes a robotic device 22, which is schematically shown in FIG. 1 and will be explained in detail later, and which is provided for transporting smoking rods, removing smoking rods from the automatic hanging line 14 and/or inserting smoking rods into the storage frame 18.

The robotic device 22 being part of the handling system 20 according to the first embodiment is shown in FIGS. 2 to 5. The robotic device 22 comprises two robotic arms 24 being movably in three dimensions. The arms 24 are arranged parallel to each other and on the same level. That means, the robotic arms 24 are fork-like. The robotic arms 24 can be attached at their one end 24a on a not shown common manipulation device of the robotic device 22.

On their opposite ends 24b, namely their free ends 24b, each robotic arm 24 is provided with a gripping device 26. Each gripping device 26 has a first jaw 28 and a second jaw 30.

The first jaw 28 is fixedly attached to the respective robotic arm 24 and extends essentially in a horizontal plane and essentially perpendicular to a crossbar 32, the crossbar 32 being attached to the robotic device 22. The first jaw 28 is arranged below the second jaw 30 and comprises an L-shaped portion 34 with an undercut 36 facing in the direction of the free end 24b of the robotic arm 24. A layer 38 is provided in the undercut 36, the layer 36 being more flexible than the jaw 28 and being able to engage a smoking rod 40 and a loop 42 of a sausage-like product W. The sausage product W comprises a loop 42 and a sausage-shaped body 44.

The second jaw 30 is self-locking to prevent an unintentional movement of the jaw 30. For example, such an unintentional movement occurs in the case of energy loss. For this purpose, there is provided a pin or stud (not shown). The second jaw 30 also comprises an L-shaped portion 46 with an undercut 48, a layer 50 being provided in the undercut 48. The layer 50 is more flexible than the jaw 30 and is able to engage the smoking rod 40 and the loop 42 of the sausage-like product W. Moreover, the second jaw 30 is arranged above the first jaw 28 (see FIGS. 2 and 3) or opposite to the first jaw 28 essentially in the same height (see FIGS. 4 and 5) and is pivotably around a pivot axis A, the pivot axis A being essentially parallel to the smoking rod 40 and the crossbar 32. The second jaw 30 can be pivoted into two positions, namely an in-operating position and an operating position. In the in-operating position, the second jaw 30 is arranged above and away from the first jaw 28, that means it is not positioned in the same height as the first jaw 28 and does not lie opposite to said first jaw 28. In this in-operating position, the second jaw 30 does not engage the smoking rod 40 (see FIGS. 2 and 3). In the operating position, the second jaw 30 lies opposite to the first jaw 28 and essentially in the same height than the first jaw 28. Thus, the layer 38 in the undercut 36 of the first jaw 28 facing the layer 46 in the undercut 48 of the second jaw 30. The operating position is also called "gripping position" as the second jaw 30 engages the smoking rod 40 (see FIGS. 4 and 5).

The gripping device 26 with the two jaws 28, 30 is able to reversibly grip the smoking rod 40.

Furthermore, the handling system 20 comprises a preventing unit 52 for preventing uncontrolled movement of the sausages 44 hanging up on the smoking rod 40 and being transported by the handling system 20. Thus, the preventing unit 52 restricts the free movement of the sausage products W. The preventing unit 52 is a separate component which can be attached to the robotic device 22, in particular to the gripping device 26. That means, the preventing unit 52 can be separately manufactured from the robotic device 22 and can be attached later.

Figure 2:
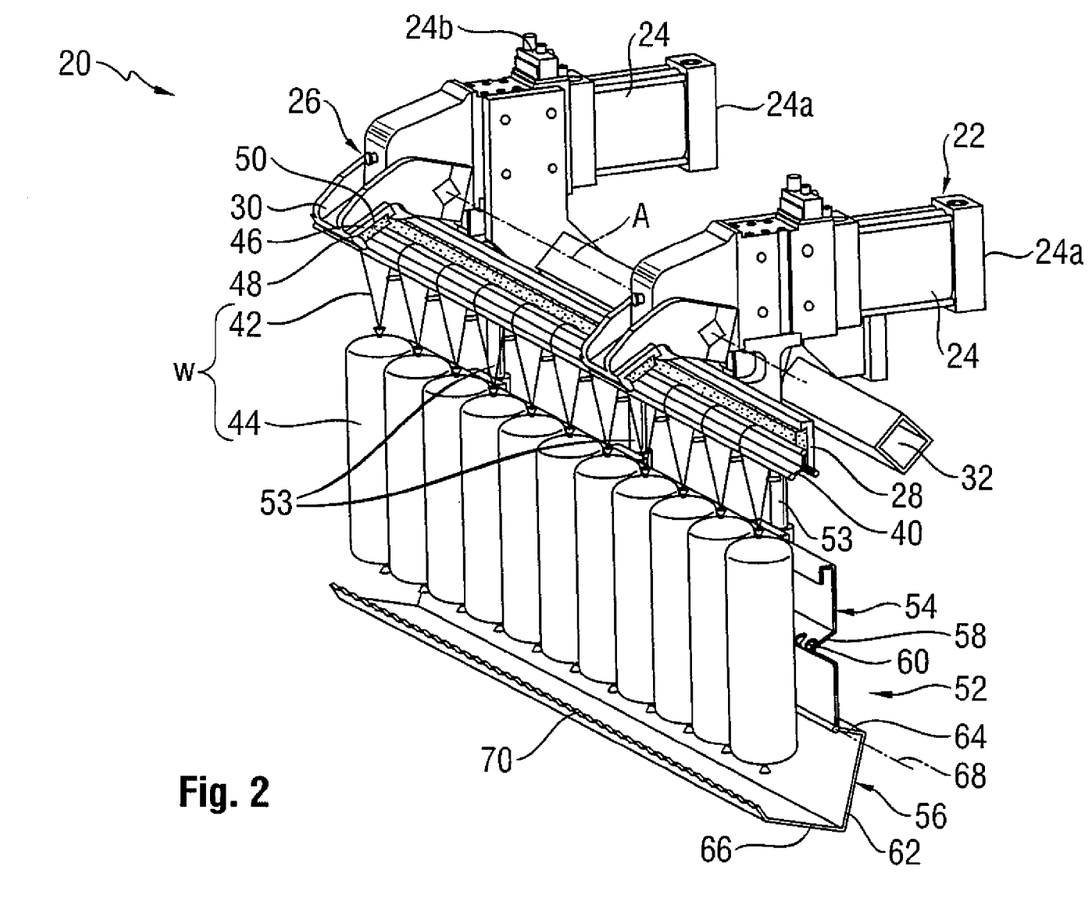
FIG. 2 is a perspective view of a handling system according to the invention with respect to a first embodiment with a gripping device and a preventing unit in an in-operating position.
Figure 3:
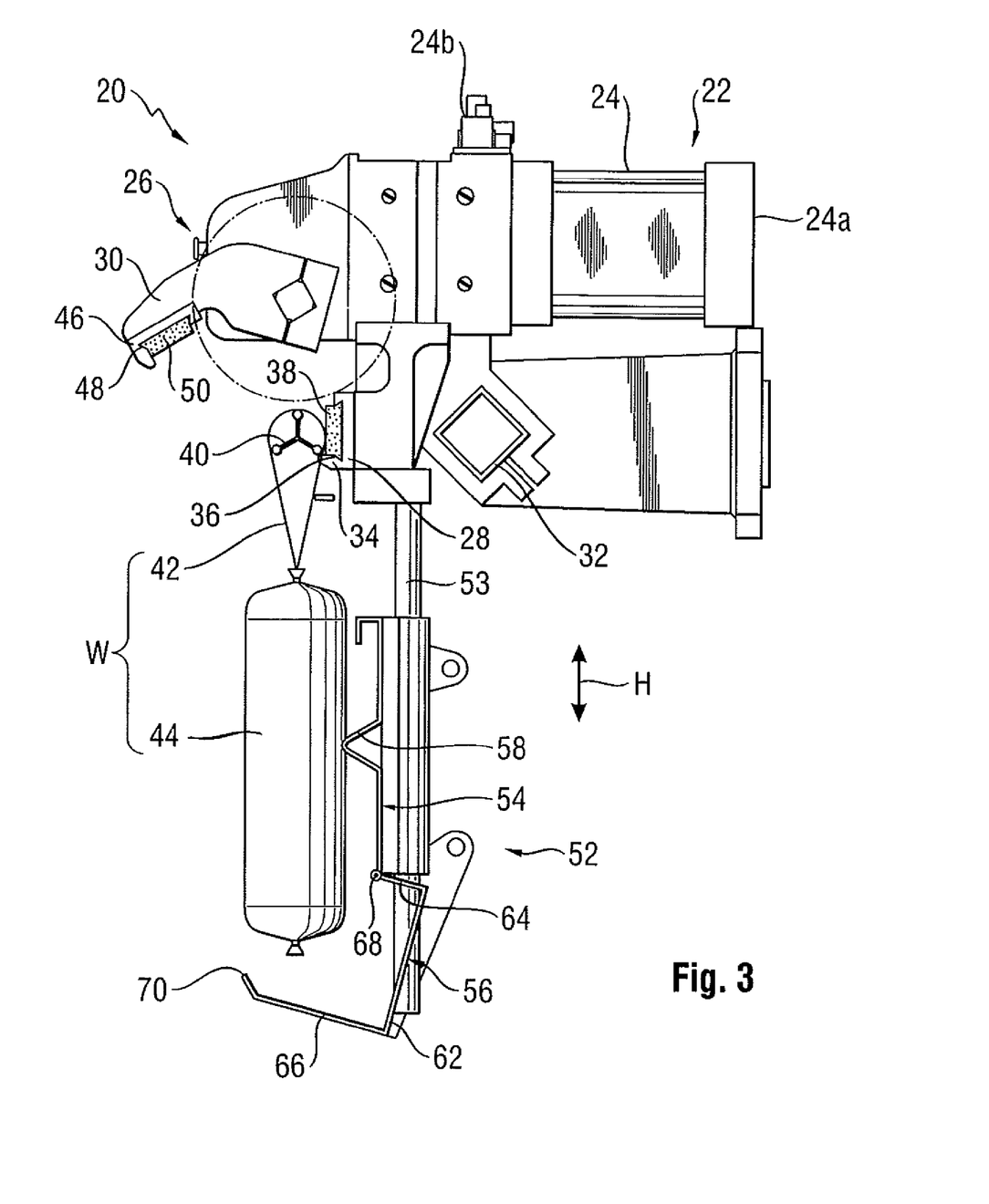
FIG. 3 is a side view of the handling system of FIG. 2.

The preventing unit 52 is able to engage the sausage products W and extends essentially over the entire length of the crossbar 32 and the smoking rod 40 when it is gripped by the gripping device 26. The preventing device 52 comprises several (three are shown in FIGS. 2 and 3) bars 53, the preventing device 52 being adjustably attached to the bars 53 in moving the preventing unit 52 along the bars 53. As the bars 53 are arranged essentially perpendicular to the crossbar 32, the vertical height of the preventing unit 52 is adjustable (see arrow H in FIGS. 3 and 5). The preventing unit 52 can be locked in several positions on the bars 53 (not shown). Thus, the preventing unit 52 is adaptable to different lengths and sizes of sausage products W.

Especially, the preventing unit 52 has a first preventing element 54 and a second preventing element 56. The first preventing element 54 is arranged on the side of the sausage product W facing the crossbar 32 and comprises a bump bar 58 running along the entire length of the preventing unit 52. Thus, the first preventing element 54 runs essentially along the entire length of the crossbar 32 and the smoking rod 40 gripped by the jaws 28, 30. The first preventing element 54 is essentially parallel to the first jaw 28, the crossbar 32 and the gripped smoking rod 40. Moreover, the first preventing element 54 has openings 60 (see FIGS. 2 and 4) being positioned on the bump bar 58 and being able to engage the sausage products W. The sizes and shapes of the openings 60 can vary; especially the shapes and sizes of the openings 60 are adaptable to the shapes and sizes of the sausage products W. Instead of openings, the bump bar 58 can also comprise burlings and/or ribs (not shown).

The second preventing element 56 is formed substantially U-shaped with a bottom part 62 and two side parts 64, 66. Each side part 64, 66 is positioned at right angle to the bottom part 62. The second preventing element 56 is retractably and movably between an in-operating position (see FIGS. 2 and 3) and an operating position (see FIGS. 4 and 5), the pivot axis being denoted with reference numeral 68. In the in-operating position, the second preventing element 56 lies on the side of the sausage products W facing in the direction of the free end 24b of the robotic arms 24. In the operating position, which is also called "preventing position", the side part 66 of the second preventing element 56 lies on the side of the sausage product W facing in the counter direction of the free end 24b of the robotic arms 24. In the operating position, the second preventing element 56 engages the sausage product W, especially the side part 66 engages the parts of the sausage products W, in particular of the sausage-shaped bodies 44, facing in the counter direction of the free end 24b of the robotic arms 24.

Figure 4:
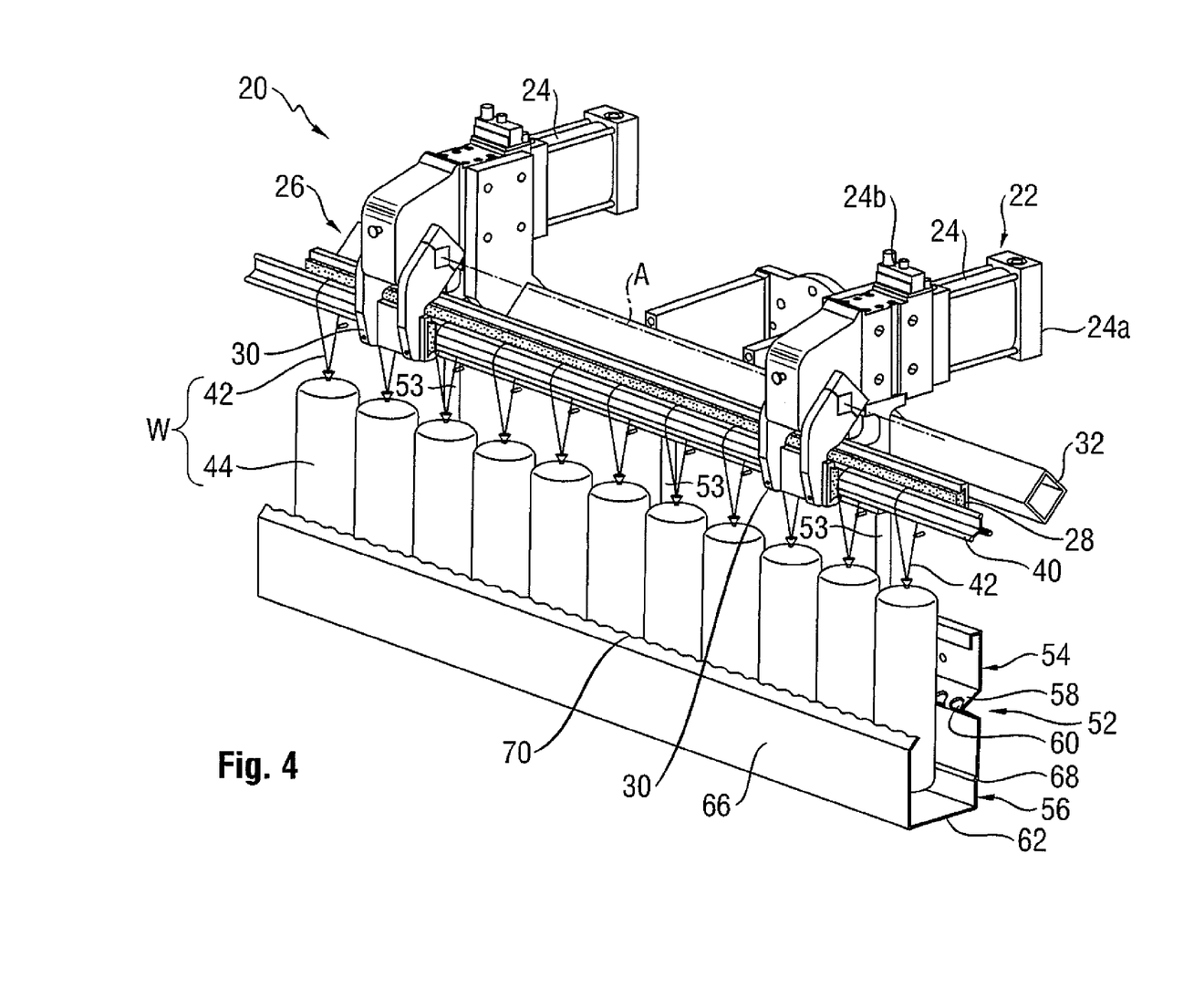
FIG. 4 is a perspective view of the handling system of FIGS. 2 and 3 with the preventing unit in an operating position.

The side part 66 has a rim 70 (see FIG. 4). The rim engages the sausage products W, in particular the sausage-shaped bodies 44 facing in the counter direction of the free end 24b of the robotic arms 24, with the second preventing element 56 in the operating position. In FIG. 4, the rim 70 is wavelike. The rim 70 can have any shape and thus can be adapted to the shape of the sausage products W.

Furthermore, there is provided a sensor device 72 which is schematically shown in FIG. 1. The sensor device 72 monitors the operating range of the handling system 20. The sensor device 72 detects an object, like an operator, being in the operating range of the handling system 20, and stops the movement of the robotic device 22 immediately as soon as such an object occurs in the operating range of the handling system 20. Thus, the sensor device 72 is a safety device preventing accidents. The sensor device 72 is able to change automatically the monitored operating range of the handling system 20, i.e. the sensor device 72 monitors a first operating range while the handling system 20 removes the smoking rods 40 from the automatic hanging line 14 and inserts them into the first storage frame 18 with rolls. Afterwards, the sensor device 72 monitors a second operating range while the handling system 20 removes the smoking rods 40 from the automatic hanging line 14 and inserts them into a second storage frame 74 with rolls (see schematically in FIG. 1). Simultaneously, an operator can transport the first storage frame 18 in a smoking chamber (not shown). The operator is not detected by the sensor device 72, as the sensor device 72 monitors the second operating range. Therefore, the handling system 20 is not stopped. The operator can transport the first storage frame 18 riskless in the smoking chamber.

In the following, the method for transporting, removing or inserting smoking rods 40 from or into a storage frame 18 is described.

At first, the method is described without the second preventing element 56.

The handling system 20 with the robotic device 22 is positioned in front of the automatic hanging line, the robotic arms 24 with the gripping devices 26 being positioned above the smoking rod 40. The robotic arms 24 with the gripping devices 26 are lowered and the stationary first jaw 28 of the gripping device 26 engages the smoking rod 40 and the first preventing element 54 engages the sausage products W (see FIGS. 2 and 3). Afterwards, the pivotable second jaw 30 pivots around the pivot axis A and engages the smoking rod 40. Afterwards, the smoking rod 40 is lifted and is tilted contrary to the direction in which the smoking rod 40 is removed. Then, the robotic device 22 is moved to the storage frame 18 with rolls, the smoking rod 40 is tilted in the direction in which the smoking rod 40 was removed and the smoking rod 40 is inserted into the storage frame 18. The preventing unit 52 prevents an uncontrolled movement of the sausage products W in engaging the sausage products W and especially restricts the free movement of the sausage products W.

Alternatively, the robotic arms 24 can be positioned in front of the automatic hanging line 14 with the gripping device 26 being tilted contrary to the direction in which the smoking rod 40 is removed. Then, the smoking rod itself will not be tilted.

In the following, the method is described with the second preventing element 56.

This method differs from the above described in that neither the robotic arms 24 nor the smoking rod 40 are tilted. That means, the handling system 20 with the robotic device 22 is positioned in front of the automatic hanging line 14, the robotic arms 24 with the gripping devices 26 being positioned above the smoking rod 40. The robotic arms 24 with the gripping devices 26 are lowered and the stationary first jaw 28 of the gripping device 26 engages the smoking rod 40 and the first preventing element 54 engages the sausage products W (see FIGS. 2 and 3). Afterwards, the pivotable second jaw 30 pivots around the pivot axis A and engages the smoking rod 40. Simultaneously, the second retractable preventing element 56 pivots around the pivot axis 64 and engages the sausages 44. Afterwards, the smoking rod 40 is lifted and the robotic device 22 is moved to and inserted into the storage frame 18. The preventing unit 52 prevents an uncontrolled movement of the sausage products W in engaging the sausage products W.

Figure 5:
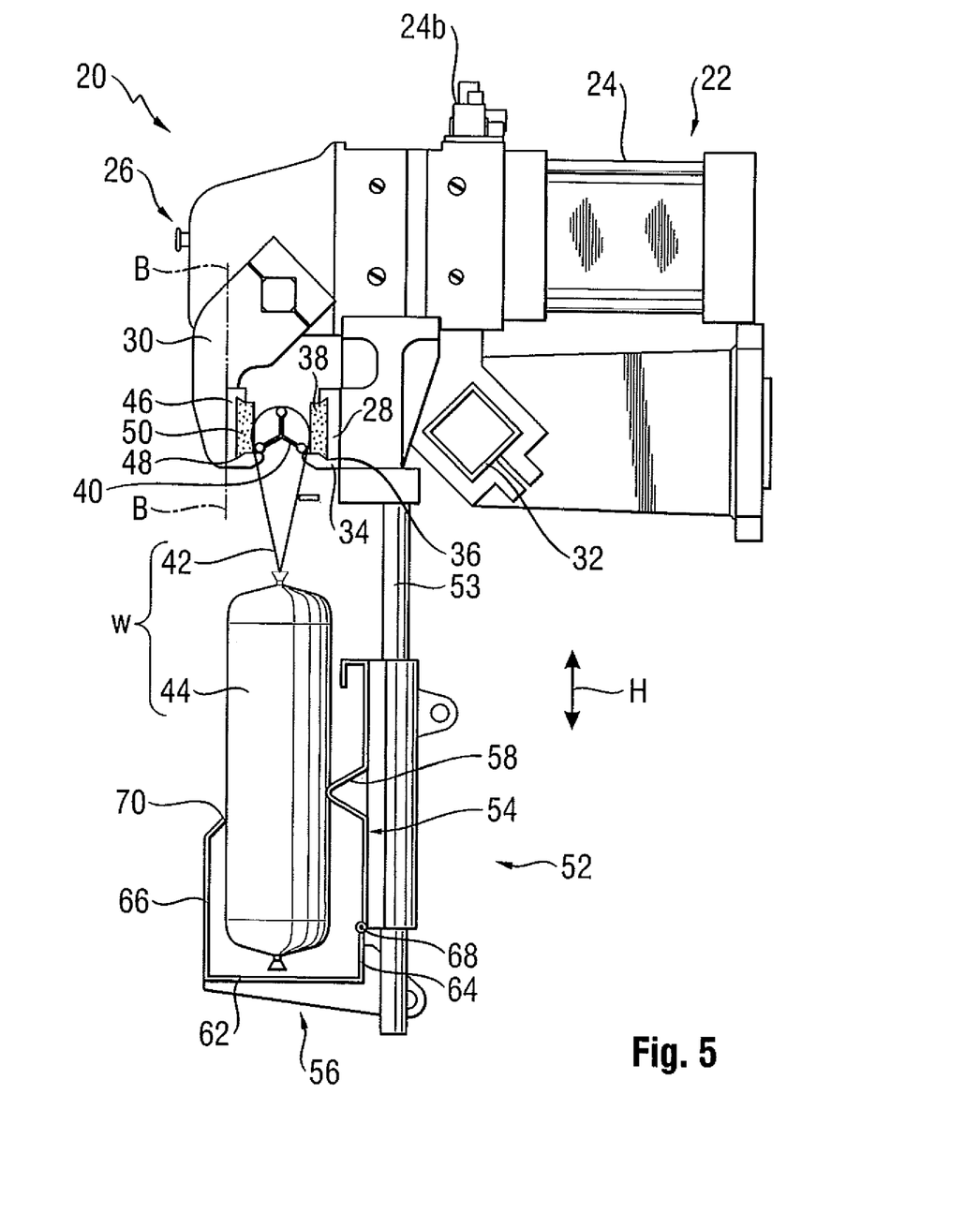
FIG. 5 is a side view of the handling system of FIG. 4.
Figure 6:
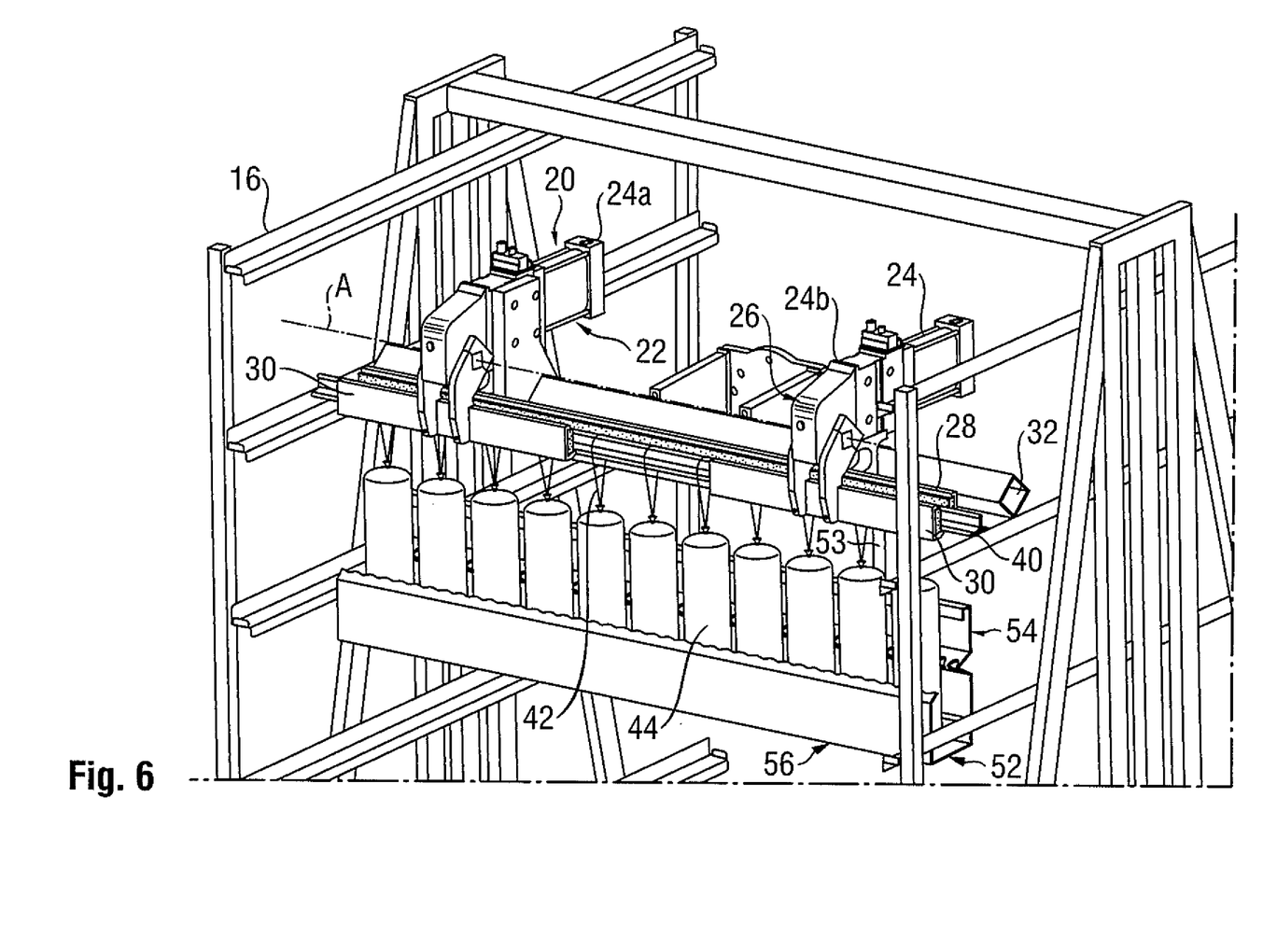
FIG. 6 is a perspective view of a handling system according to the invention with respect to a second embodiment with a gripping device and a storage frame.
Figure 7:
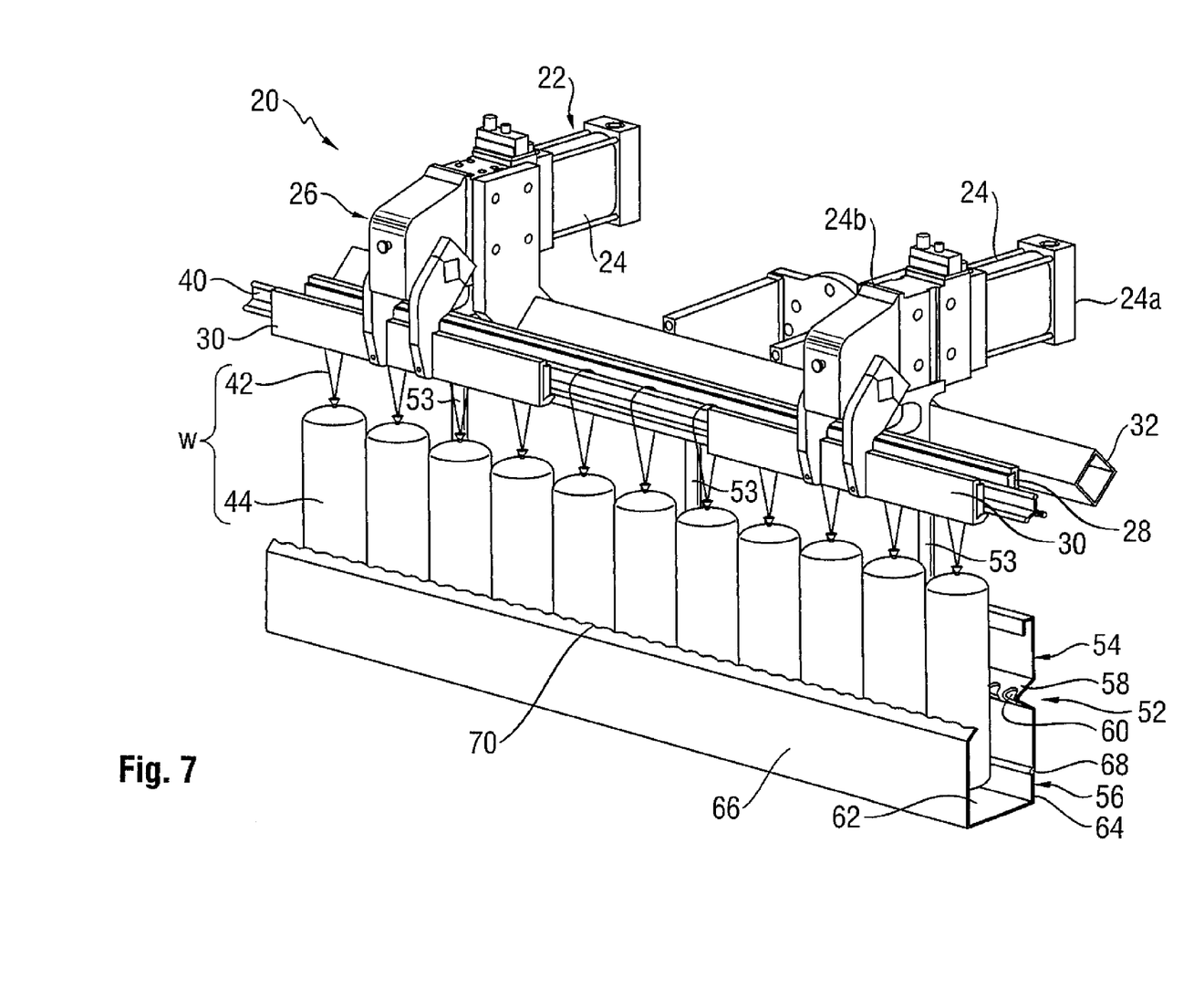
FIG. 7 is a perspective view of the handling system of FIG. 6.

A second embodiment of the handling system 20 is shown in FIGS. 5 and 6. The second embodiment differs from the first embodiment in the length of the pivotable second jaws 30, in particular the second jaws 30 are longer than the second jaws according to the first embodiment. The other components and the method correspond to the components and method of the already in detail described first embodiment, to which is referenced herewith.

Alternatively, the jaw which is positioned further away from the free end 24b of the robotic arms 24 is fixedly attached to the robotic arm 24 and the other jaw is pivotably around the pivot axis.

According to another embodiment, the first and/or second jaw is movable linearly and reversibly towards the other jaw and the smoking rod. For example, the second jaw is pivoted around the pivot axis and the first jaw is moved linearly towards the second jaw. Furthermore, the second jaw may be positioned from above such that the smoking rod is located between the first and second jaw. Afterwards, the first and/or second jaw is moved linearly towards each other. Thereby, the jaws may be self-locking.

In a further embodiment, which is not shown, the second jaw extends over the entire length of the first jaw. Thus, the holding force is increased.

A part of the second jaw, in particular the L-shaped portion 46 with the undercut 48 and the layer 50, may be pivoted around an axis B which is perpendicular to the longitudinal axis and the lateral axis of the robotic arm 24. The axis B is shown in FIG. 5. With other words, the axis B is parallel to the vertical axis of the robotic arm or with other words, the axis B is parallel to the bars 53 of the preventing unit 52. Thus, the second jaw compensates unevenness of smoking rod 40, especially unevenness seen in the longitudinal axis of the smoking rods 40.

The invention claimed is:

1. A handling system for transporting, removing or inserting rod-like elements from or into a storage frame, the rod-like elements configured for storing products, each having a sausage-shaped body and a loop configured for pendulous storage along one of the rod-like elements, the handling system comprising:
    a robotic device with at least one robotic arm movable in three dimensions, and
    at least one gripping device for reversibly gripping the rod-like elements, wherein the gripping device is attached to the robotic arm of the robotic device,
    where the robotic device is provided with a preventing unit configured to prevent uncontrolled movement of the products pendulously hanging from one of the rod-like elements, where the preventing unit is configured to be transported by the handling system with one of the rod-like elements.

2. The handling system according to claim 1, where the preventing unit is at least adjustably in its vertical height.

3. The handling system according to claim 1, where the preventing unit includes a first preventing element wherein the first preventing element comprises openings positioned on a bump bar, the openings being configured to engage the products.

4. The handling system according to claim 3, where the preventing unit comprises a second preventing element, the second preventing element being substantially U-shaped.

5. The handling system according to claim 4, where the second preventing element is moveable between an in-operating position and an operating position in which the second preventing element engages the products.

6. The handling system according to claim 1, where the gripping device comprises a first jaw being fixedly attached to the robotic device and a second jaw being pivotable around a pivot axis, the pivot axis being essentially parallel to the rod-like element.

7. The handling system according to claim 6, where at least one jaw comprises a substantially L-shaped portion, each portion having an undercut.

8. The handling system according to claim 6, where the second jaw is self-locking to prevent an unintentional movement of the jaw.

9. The handling system according to claim 1 further comprising,
    a sensor device for monitoring an operating range of the handling system, the operating range being changed automatically during operation.

10. A gripping device suitable for use in a handling system, the gripping device comprising:
    a first jaw being fixedly attached to a robotic device and a second jaw being pivotable around a pivot axis, the pivot axis being essentially parallel to a rod-like element configured for storing products and having a sausage-shaped body and a loop configured for pendulous storage of the products along the rod-like element, and
    a preventing unit configured to prevent uncontrolled movement of the products pendulously hanging from the rod-like element, where the preventing unit is configured to be transported by the handling system with the rod-like element.

* * * * *